(12) United States Patent
Fujibayashi

(10) Patent No.: US 7,133,988 B2
(45) Date of Patent: Nov. 7, 2006

(54) METHOD AND APPARATUS FOR MANAGING DIRECT I/O TO STORAGE SYSTEMS IN VIRTUALIZATION

(75) Inventor: Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 217 days.

(21) Appl. No.: 10/784,994

(22) Filed: Feb. 25, 2004

(65) Prior Publication Data

US 2005/0188006 A1    Aug. 25, 2005

(51) Int. Cl.
*G06F 12/08*    (2006.01)

(52) U.S. Cl. ........................ 711/162; 711/114; 711/112; 711/147; 709/215; 709/217; 709/219; 709/226; 707/100; 707/200; 707/201

(58) Field of Classification Search .................... None
See application file for complete search history.

(56) References Cited

U.S. PATENT DOCUMENTS

| | | | |
|---|---|---|---|
| 5,889,935 A * | 3/1999 | Ofek et al. ........................ 714/6 |
| 6,141,707 A * | 10/2000 | Halligan et al. .................. 710/36 |
| 6,173,293 B1 * | 1/2001 | Thekkath et al. ............... 707/201 |
| 6,199,074 B1 * | 3/2001 | Kern et al. ...................... 707/204 |
| 2002/0004857 A1 | 1/2002 | Arakawa et al. | |
| 2002/0112113 A1 | 8/2002 | Karpoff et al. | |
| 2002/0156984 A1 * | 10/2002 | Padovano ......................... 711/148 |
| 2003/0055972 A1 | 3/2003 | Fuller et al. | |
| 2003/0115218 A1 | 6/2003 | Bobbitt et al. | |
| 2003/0140051 A1 | 7/2003 | Fujiwara et al. | |
| 2003/0191810 A1 | 10/2003 | Muhlestein et al. | |
| 2003/0220985 A1 | 11/2003 | Kawamoto et al. | |
| 2004/0111485 A1 * | 6/2004 | Mimatsu et al. ............. 709/213 |

FOREIGN PATENT DOCUMENTS

| | | |
|---|---|---|
| CA | 2344597 | 12/2001 |
| EP | 1178407 | 2/2002 |

OTHER PUBLICATIONS

Karamanolis, Christos et al. "DiFFS: a Scalable Distributed File System", Jan. 24, 2001. HP Labratories Palo Alto, HPL-2001-19.*

* cited by examiner

*Primary Examiner*—Mano Padmanabhan
*Assistant Examiner*—Patrick M Moore
(74) *Attorney, Agent, or Firm*—Mattingly, Stanger, Malur & Brundidge, P.C.

(57) ABSTRACT

A network storage virtualization method and apparatus in a network storage system having a plurality of network storage devices. According to the present invention a client connected via a network is allowed to access the network storage devices as one virtual network storage system. In addition the client is permitted to access the network storage devices separate from the virtualized network storage system for other purposes such as reporting, verifying or backing up.

20 Claims, 6 Drawing Sheets

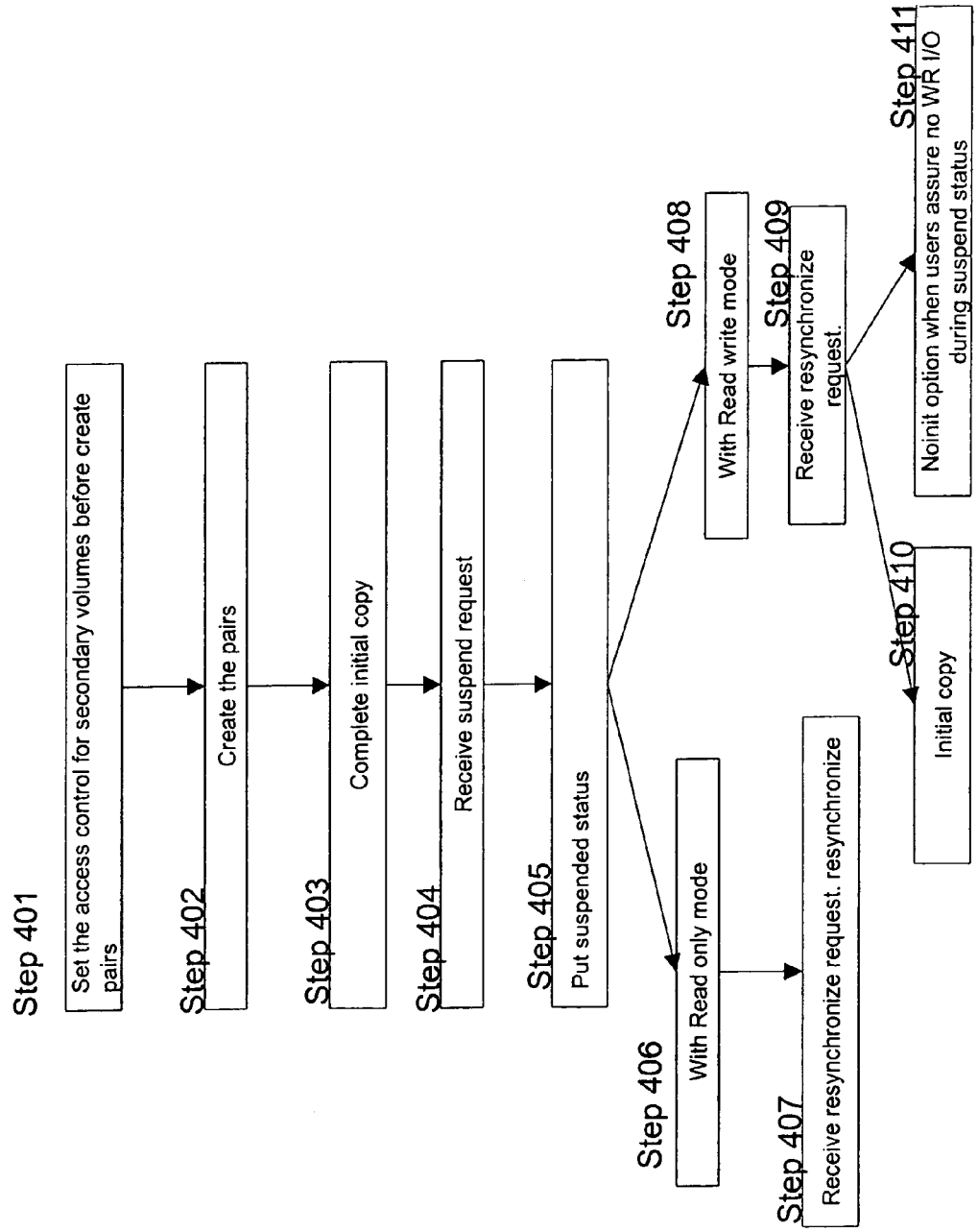

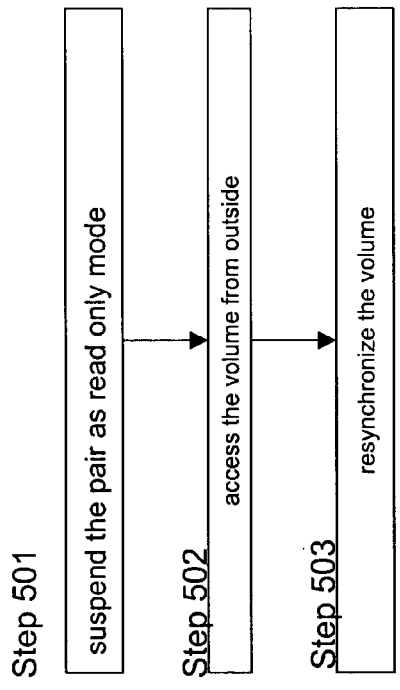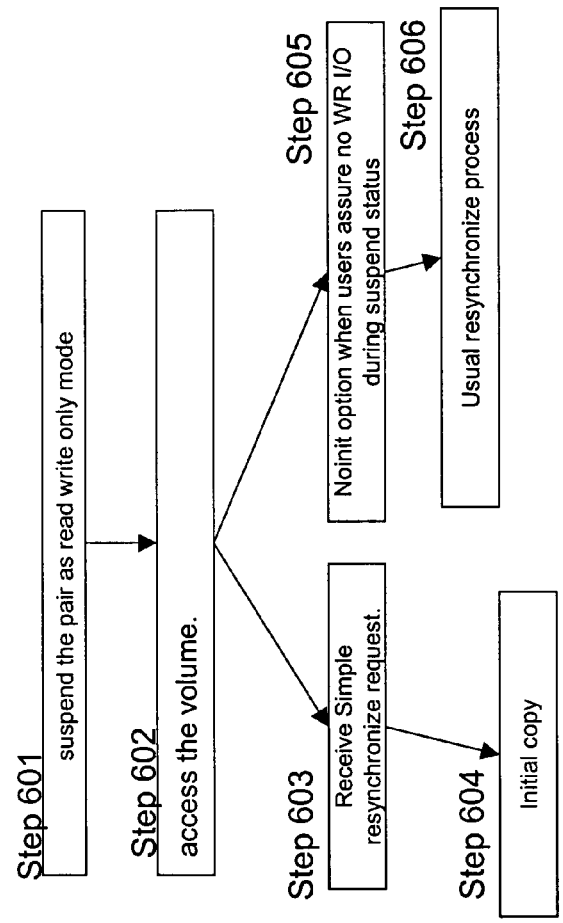

METHOD AND APPARATUS FOR MANAGING DIRECT I/O TO STORAGE SYSTEMS IN VIRTUALIZATION

BACKGROUND OF THE INVENTION

The present invention relates generally to method and apparatus of virtualizing network storage. More particularly the present invention relates to a method and apparatus for virtualizing network storage and permitting access to the network storage separate from virtualization apparatus.

A conventional information processing system stores information in a storage directly connected to a computer system. An access to information stored in the storage is permitted only through the use of the directly connected computer. Accordingly, the other computer systems need to access the data via the directly connected computer. In recent years, the development of network technologies and a dramatic increase in the amount of information to be stored promote separation of a computer system for processing information and a storage system for storing information. Thus, storage can be connected to the network and has become capable of being shared by a plurality of computer systems. Such networked storage is referred to as a network storage.

Examples of such network storage include a storage area network (SAN) storage that is connected by a SAN and provides a block access, a network attached storage (NAS) that is connected for example to an IP network and provides file access, and a Web storage that offers an access according to an interface HTTP protocol or its extended protocol for Web accesses.

As network storages become widely used, a system administrator needs to manage a plurality of network storages connected to the network. When the amount of data to be stored exceeds a maximum value for the existing network storage, for example, it is necessary to add a new network storage and reconfigure the system by re-distributing data or the like. A drastic increase in the need for storage capacities forces repeated system reconfigurations, thus increasing system management costs.

In order to conserve system management costs, a technology for virtualizing storages, specifically consolidating the storage resources as "one big capacity pool" is mandatory so that a plurality of network storages can be viewed as a single storage from the computer system and the entire system is not affected by addition of new devices. Open heterogeneous environments need such technology to manage those resources more efficiently. Various systems have been developed and proposed for virtualizing storages.

However, the conventional configuration of a virtualization box for virtualizing storages is not particularly good being that a customer can not access their data via the host channels for connecting the host to the storage device for other purposes such as reporting, verifying or backing up. In this configuration the customer is required to use one of the ports of the virtualization box.

SUMMARY OF THE INVENTION

The present invention provides a method and apparatus for virtualizing network storage and permitting access to the network storage separate from virtualization apparatus.

Particularly the present invention provides a network storage virtualization method and apparatus in a network storage system having a plurality of network storage devices. According to the present invention a client connected via a network is allowed to access the network storage devices as one virtual network storage system. In addition the client is permitted to access the network storage devices separate from the virtualized network storage system for other purposes such as reporting, verifying or backing up.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIG. 4 is a flowchart of the process performed to configure an access permission of a volume from outside of a storage system controller;

FIG. 5 illustrates the steps of a process to access a volume for purposes such as reporting in the read only mode; and FIG. 6 illustrates the steps of a process to access a volume for purposes such as reporting in the read/write mode.

DETAILED DESCRIPTION OF THE INVENTION

Figure 2:
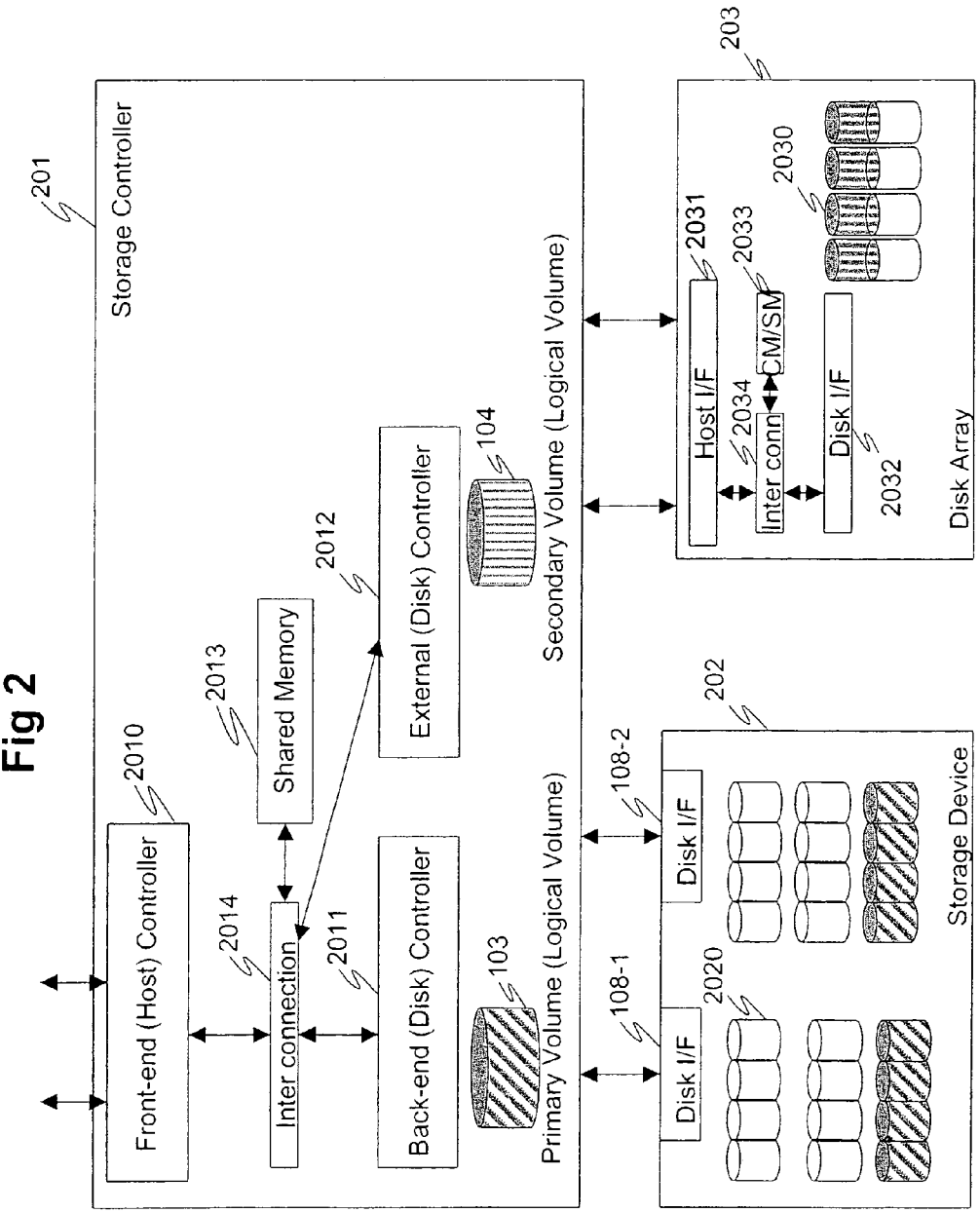
FIG. 2 shows an example of the internal configuration of a storage system having a storage controller.
Figure 3:
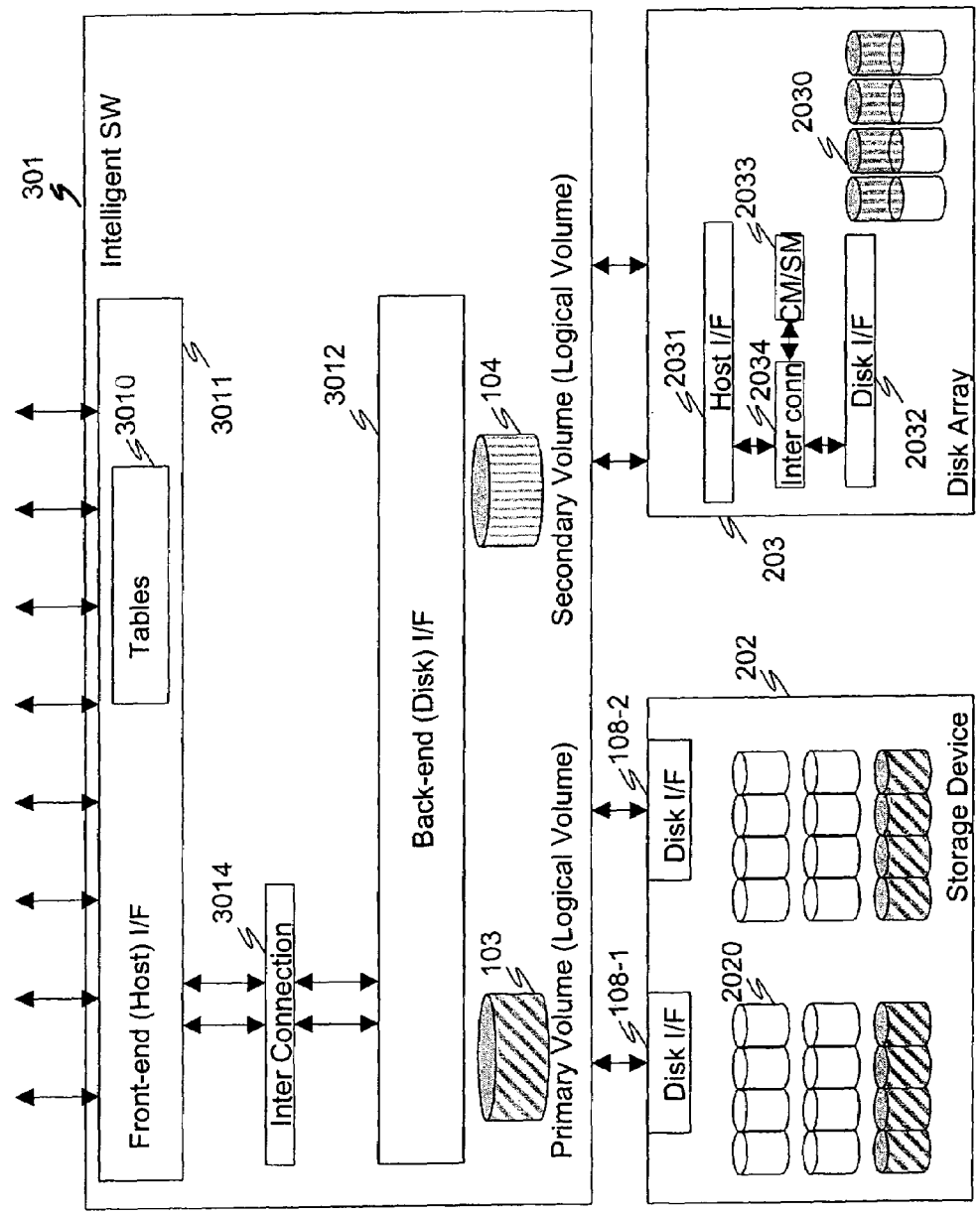
FIG. 3 illustrates another example of the internal configuration of a storage system having an intelligent switch.

Examples of the consolidation of storage resources are shown in FIGS. 2 and 3.

As per FIG. 2, the storage controller 201 includes a front end controller 2010 for interfacing with a channel of a host, back end controller 2011 for interfacing with a storage device 202 via disk interface (I/F) 108-1 and 108-2, an external storage controller 2012 for interfacing with a disk array 203, shared memory 2013 for caching data including control data transferred between the host and storage device 202 and the disk array 203 and an interconnection apparatus 2014 for interconnecting the front end controller 2010, back end and external storage controllers 2011 and 2012, respectively and shared memory 2013. Back end controller 2011 interfaces to the primary volume 103 and external storage controller 2012 interfaces to local secondary volume 109. It should be noted that the primary volume 103 and the local secondary volume 104 are logical volumes. The primary volume 103 is defined on a plurality of disk devices 2020 included in the storage device 202.

The local secondary volume 104 is defined on a plurality of disk drives 2030 included in the disk array 203 which includes a host interface (I/F) 2031 for interfacing with the storage controller 201, a disk I/F 2032 for interfacing with the disk drives 2030, a shared memory 2033 for caching data including control data transferred between the storage controller 201 and disk drives 2030, and an interconnection apparatus 2034 for interconnecting the host I/F 2030, disk I/F 2032, and shared memory 2033.

As illustrated in FIG. 3 an intelligent switch (SW) 301 in place of the storage controller 201 as per FIG. 2 is provided having a front end (host) controller 3011 for interfacing with a channel of a host, a back end controller 3012 for interfacing with the storage device 202 and the disk array 203 and an interconnection apparatus 3014 for interconnecting the front end controller 3011 and back end controller 3012. The back end controller 3012 interfaces to the primary volume 103 and the local secondary volume 109. The front end controller 3011 includes mapping tables 3010 having stored therein mapping information for mapping virtual volumes to the storage device 202 or the disk array 203. Particularly the mapping tables 3010 set relationships between virtual volume block address and actual block address on the storage device 202 or the disk array 203. As described above the primary volume 103 is defined on a plurality of disk devices 2020 included in the storage device 202 and the local secondary volume 104 is defined on a plurality of disk drives 2030 included in the disk array 203.

The various storage resources such the storage device 202, disk array 203, or any other such storage such as just a bunch of disks (JBOD), etc., are connected to a virtualization box such as the storage controller 201 or the intelligent SW 301, which can organize the various storages. In this case the ports of the storage device 202 and the disk array 203 are connected to the storage controller 201 or the intelligent SW 301 and these ports are all under the control of the storage controller 201 or the intelligent SW 301. Storage device 202, the disk array 203 or any other such storage device have their own high-speed host channels such as Fibre channel or Giga Ethernet. If all of the ports of the storage device 202 and the disk array 203 are connect to the storage controller 201 or the intelligent SW 301, then there are no connections to the host channels of the storage devices available for other uses.

Figure 1A:
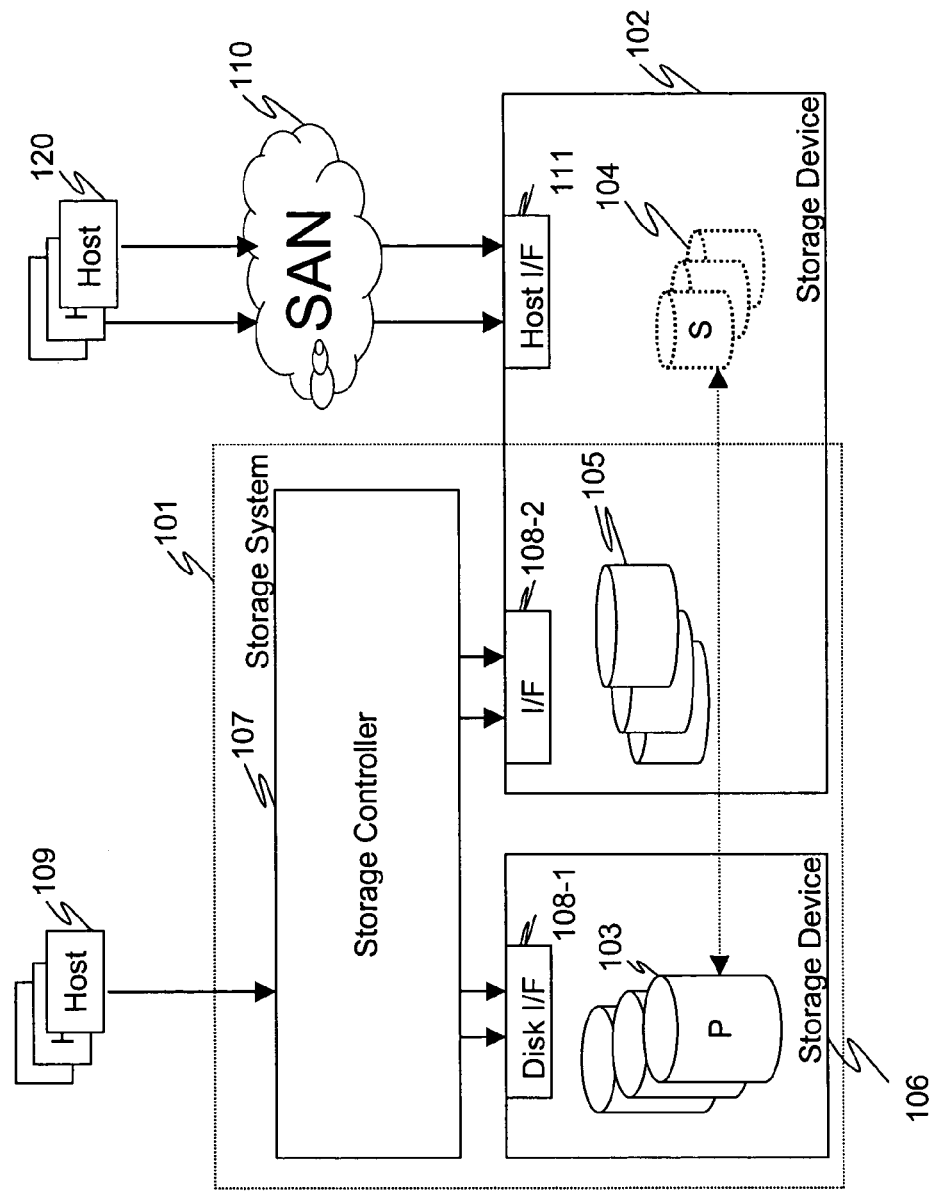
FIGS. 1A and B are diagrams for explaining the basic system configuration of the present invention with replication.

FIG. 1A illustrates the basic system configuration of the present invention with replication. As per FIG. 1A, a first storage system 101 is provided and includes a primary volume (P) 103, a local secondary volume (S) 104 which is a local mirror or snap shot of the primary volume at a certain point in time, and other volumes 105. Primary volume 103 is provided as part of the storage system 101 via a storage device 106 and the local secondary volume 104 and the other volumes 105 are provided by a storage device 102. The storage system 101 also includes a controller 107 for controlling the storage system 101 that interfaces with each of the storage devices 106 and 102 via a disk interface (I/F) 108-1 and interface (I/F) 108-2 respectively. The storage system 101 is connected to a host 109 so as to receive input/output (I/O) commands, for example, write I/O commands from the host 109.

The storage device 102 also includes a host I/F 111 which allows the storage device 102 to interface, for example, with a host 120 via a storage area network (SAN) 110.

I/F 108-2 is similar to the host I/F 111. I/F 108-2 works as a target port for the storage device 102 and controller 107 recognizes I/F 108-2 as a target port for access to the local secondary volumes 104 and possibly the other volumes 105. Thus controller 107 recognizes I/F 108-2 in the same manner as host 120 recognizes host I/F 111 as a target port for access to volume 104.

Thus, according to the present invention, the storage controller 107 provides virtualization functions with respect to the storage devices 106 and 102 thereby organizing the storage devices 106 and 102 to appear as a single storage when accessed by the host 109. However, the present invention provides apparatus so as to permit access to the storage such as, for example, provided by storage device 106 separate from the virtualization function being performed by the controller 107. The present invention accomplishes such by providing the storage device 102 with the host I/F 111 so as to permit the host 120 via the SAN 110 to access the local secondary volume 104 for reporting verifying backing up or any other such functions separate from the virtualization functions provided by the controller 107. Access to the local secondary volumes 104 are provided by the storage device 102 in a manner such that access to the other volumes 105 are not permitted. Particularly, access to the other volumes 105 in the storage device 102 are locked out in a manner so as to only permit access from the storage system 101 via the I/F 108-2.

Figure 1B:
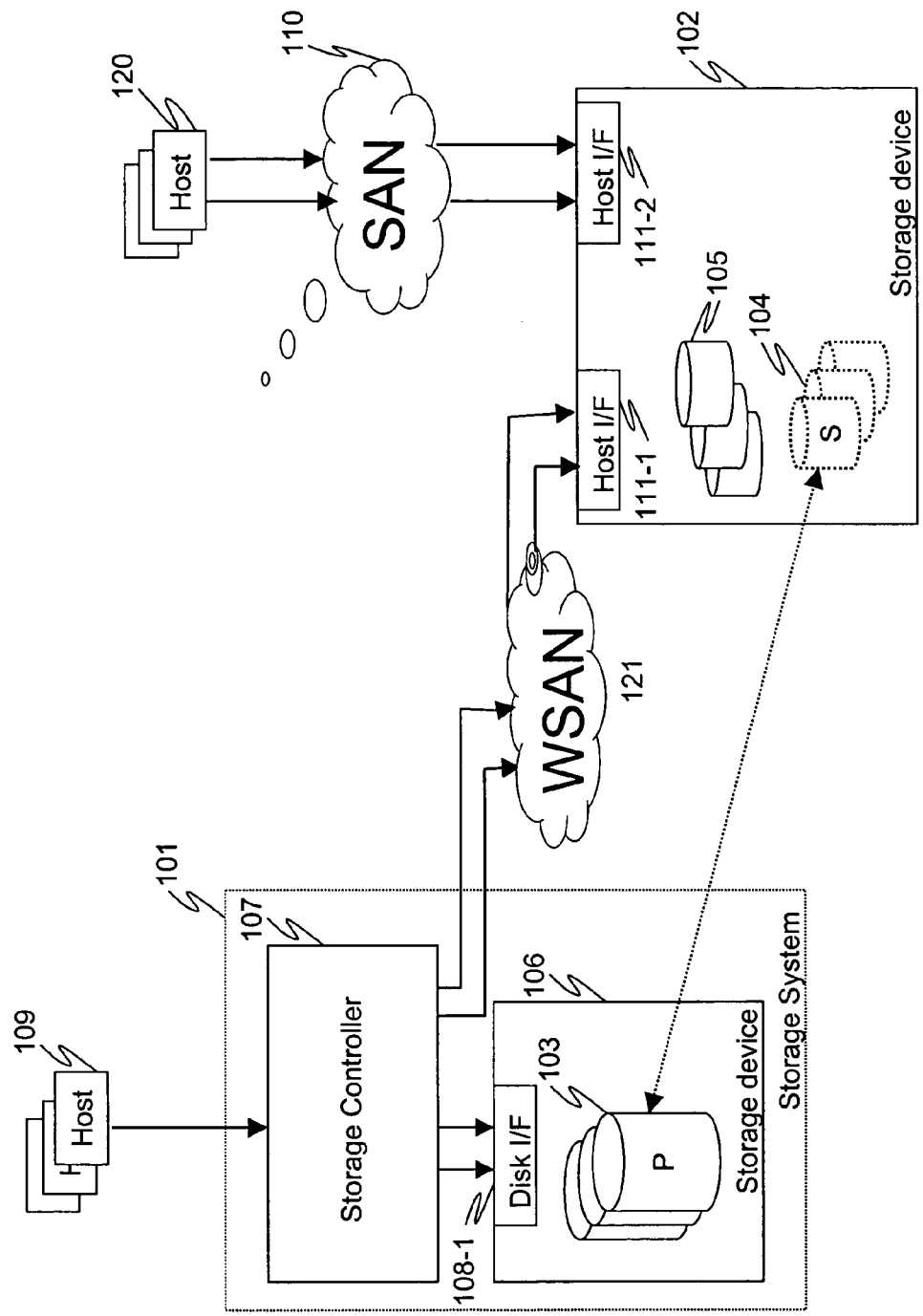

FIG. 1B illustrates a configuration similar to that of FIG. 1A with the exception that the local secondary volume 104 and the other volumes 105 are provided by the storage device 102 which is connected to the controller 107 via a wide storage area network (WSAN) 121 and a host I/F 111-1. Thus, the principle is still the same as that described above wherein access to the local secondary volume 104 is provided to the host 120 via the SAN 110 and the host I/F 111-2 separate from the virtualization functions provided by the controller 107. As described above, access to the other volume 105 by the host 120 for any device other than the storage system 101 is not permitted and is specifically locked out.

According to the present invention, access to the other volumes 105 of the storage device 102 is locked out using at least two different methods. A first method is not expose the other volumes 105 to the host I/F 111 or the host I/F 111-2 which interface with the host 120 via the SAN 110. Another method is to filter I/O accesses to the storage device 102 using logical unit number (LUN) masking or a LUN security function and the storage device 102. This method allows for a registered node having a pre-designated world wide name (WWN) to access the other volumes 105. Still yet another method is to mask the LUN in the host bus adapter (HBA) level. The HBA is an I/O adapter that sits between the computer's bus and the fiber channel loop and manages the transfers of information between the two channels. The HBA can map specific LUNs for filtering. Thus, the key point according to the present invention as is clear from the above is to make the function of permitting access to the secondary volume separate from the virtualization in alignment with the user's definition, pair status or policy of direct I/O to the secondary volume from outside of the storage system control.

Another manner of permitting access to the secondary volume 104 of the second storage device 102 is to set the second storage device 102 to permit direct I/O access from, for example, the host 120 via the SAN 110. In order to accomplish such the replication function and set up access control must be configured. The flowchart illustrated in FIG. 4 shows the process of the steps to configure the access permission of the secondary volume 104 from outside of the controller 107.

As illustrated in FIG. 4 the access control for the secondary volume 104 must be set to, for example, read only mode before creating the local or remote mirroring pair (step 401). Thereafter, the mirroring pair between primary volume 103 and secondary volume 104 is created (step 402). So as to establish a mirror or snap shot of the primary volume in the secondary volume 104 at a certain point in time a complete initial copy of the primary volume 103 is taken and stored in the secondary volume 104 (step 403). Thereafter, the second storage device 102 receives a suspend request (step 404) and places the mirroring pair into the suspend status so as to permit the setting of the access control according to the user choice (step 405). If the user chooses the read only mode for the secondary volume 104 in the second storage device 102 such as for reporting purposes, the secondary volume 104 is set to the read only mode for I/Os from outside of the storage controller 107 (step 406). Thereafter, the mirroring pair receives a re-synchronization request so as to re-synchronize the mirroring pair when in the read only mode (step 407). However, if the user chooses the read/write mode for the secondary volume 104 then the read/write mode in the secondary volume 104 of the second storage device 102 is set (step 408). Thereafter, the mirroring pair receives the re-synchronization request so as to re-synchronize the secondary volume 104 with the primary volume 103 using the initial copy (steps 409 and 410). However, if the user can make sure that no write request has been performed the user can specify the specific option for re-synchronization thereby avoiding use of the initial copy (step 411).

FIG. 5 illustrates the steps of the process to be performed to permit access of the secondary volume for reporting purposes in a read only mode. As per the flowchart in FIG. 5 synchronization of the mirroring pair, namely, the primary volume 103 and the secondary volume 104 which are set in the synchronous mode is suspended (step 501). Thereafter, access to data on the secondary volume 104 is permitted via the host I/F 111. Once the access is completed synchronization between the remote mirroring pair is reestablished (step 503).

FIG. 6 illustrates the details of the steps to be performed to permit access of the secondary volume 104 when it is set in the read/write mode. As per the flowchart of FIG. 6 synchronization of the mirroring pair, namely the primary volume 103 and the secondary volume 104 being set in the read/write mode, is suspended (step 601). Once suspended access to the secondary volume 104 is permitted via the host I/F 111 (step 602). Thereafter, re-synchronization is performed in the mirroring pair and if no specific option is selected (step 603) an initial copy is made of the primary volume 103 (step 604). However, alternatively once access to the secondary volume 104 is completed re-synchronization of the mirroring pair is conducted with a specific option such as, for example, no INIT (step 605). Thereafter, the usual re-synchronization process is started (step 606).

Therefore, according to the above, the present invention provides a network storage visualization method and apparatus in a network storage system having a plurality of network storage devices wherein a client is allowed to access the network storage devices as one virtual network storage system and is permitted to access the network storage device separate from the virtualized network storage system. According to the present invention such is accomplished by providing a storage device such as that illustrated in FIGS. 1A and B of the present application, such storage device having a host I/F 111 to which a host 120 via, for example, a SAN 110 can access the secondary volume 104 of a mirroring pair without use of the virtualization functions provided by the storage controller 107.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A network storage virtualization method in a network storage system having a plurality of network storage devices, said method comprising:
   allowing a client connected via a network to access the network storage devices as one virtual network storage system; and
   permitting said client to access the network storage devices separately from said virtual network storage system,
   wherein a first network storage device includes a first disk interface (I/F) which is connected to an apparatus having a function of forming said network storage devices as one virtual network storage device,
   wherein a second network storage device includes a second disk I/F which is connected to said apparatus having a function of forming said network storage devices as one virtual network storage device and a host I/F which is connectable to an external device so as to permit said external device to access the network storage devices separately from said apparatus having a function of forming said network storage devices as one virtual network storage device,
   wherein said external device is permitted to access a secondary volume which is a copy of a primary volume and not permitted to access volumes other than said secondary volume, and
   further comprising the step of configuring access control of said secondary volume from outside of said apparatus having a function of forming said network storage devices as one virtual network storage device,
   wherein said configuring step comprises the steps of:
   creating a mirroring pair between said primary volume and said secondary volume at a certain point in time by taking a complete initial copy of said primary volume and storing said complete initial copy in said secondary volume;
   receiving in said second storage device a suspend request;
   placing the mirroring pair into a suspend status to permit setting of the access control according to user selection;
   if the user chooses a read only mode, setting said secondary volume to the read only mode for input/output (I/O) requests from said external device and re-synchronizing the mirroring pair; and
   if the user chooses a read/write mode, setting said secondary volume to the read/write mode for I/O requests from said external device and re-synchronizing the mirroring pair.

2. A network storage virtualization method according to claim 1, wherein when said secondary volume is set to the read only mode access to said secondary volume is performed according to the steps of:
   suspending synchronization of the mirroring pair including said primary volume and said secondary volume;
   permitting access to data on said secondary volume in response to an I/O request via the host I/F; and
   upon completion of said access, re-synchronizing the mirroring pair.

3. A network storage virtualization method according to claim 1, wherein when said secondary volume is set to the read/write mode access to said secondary volume is performed according to the steps of:
   suspending synchronization of the mirroring pair including said primary volume and said secondary volume;
   permitting access to data on said secondary volume in response to an I/O request via the host I/F; and upon completion of said access, re-synchronizing the mirroring pair.

4. A storage system comprising:

a first network storage device which includes a primary volume;

a second network storage device which includes a secondary volume which is a copied volume of the primary volume and volumes other than the secondary volume; and a virtualization apparatus, which is connected to each of said first and second network storage devices, and allows a client connected via a network to access the network storage devices as one virtual network storage system, wherein said client is permitted to access the network storage devices separately from said virtualization apparatus, wherein said first network storage device includes a first disk interface (I/F) which is connected to the virtualization apparatus, wherein a second network storage device includes a second disk I/F which is connected to said virtualization apparatus and a host I/F which is connectable to an external device so as to permit said external device to access the network storage devises separately from said virtualization apparatus, wherein said external device is permitted to access said secondary volume which is a copy of said primary volume and not permitted to access said volumes other than said secondary volume, wherein access control of said secondary volume is configured from outside of said virtualization apparatus, and wherein said access control of said secondary volume is configured by creation a mirroring pair between said primary volume and said secondary volume at a certain point in time by taking a complete initial copy of said primary volume and storing said complete initial copy in said secondary volume, receiving in said second storage device a suspend request, placing the mirroring pair into a suspend status to permit setting of the access control according to user selection, if the user chooses a read only mode, setting said secondary volume to the read only mode for input/output (I/O) requests from said external device and resynchronizing the mirroring pair, and if the user chooses a read/write mode, setting said secondary volume to the read/write mode for I/O requests from said external device and re-synchronizing the mirroring pair.

5. A storage system according to claim 4, wherein when said secondary volume is set to the read only mode access to said secondary volume is performed by suspending synchronization of the mirroring pair including said primary volume and said secondary volume, permitting access to data on said secondary volume in response to an I/O request via the host I/F, and upon completion of said access, re-synchronizing the mirroring pair.

6. A storage system according to claim 4, wherein when said secondary volume is set to the read/write mode access to said secondary volume is performed by suspending synchronization of the mirroring pair including said primary volume and said secondary volume, permitting access to data on said secondary volume in response to an I/O request via the host I/F, and upon completion of said access, re-synchronizing the mirroring pair.

7. A storage system comprising:

a first network storage device including a primary volume and a first interface (I/F);

a second network storage device including a secondary volume that forms a mirroring pair with said primary volume, said second network storage device including other volumes other than the secondary volume, said second network storage device including a second I/F; and a virtualization apparatus that is connected to be able to communicate with said first network storage device via said first interface and said second network storage device via said second interface, and that allows a client connected via a network to access the first and second network storage devices as one virtual network storage system;

wherein a computer is connectable to access the network storage devices separately from said virtualization apparatus via a third I/F included in one of said first network storage device or said second network storage device for configuring the network storage devices.

8. A storage system according to claim 7, wherein said first I/F in said first network storage device is a first disk I/F which is connected for communication with the virtualization apparatus, wherein said second I/F in said second network storage device is a second disk I/F which is connected for communication with said virtualization apparatus, and wherein said third I/F is a host I/F which is connectable for communication to the computer so as to permit said computer to access the network storage devices separately from said virtualization apparatus for configuring the network storage devices.

9. A storage system according to claim 8, wherein said computer is permitted to access said secondary volume which forms the mirroring pair with said primary volume, and not permitted to access said other volumes other than said secondary volume.

10. A storage system according to claim 9, wherein said computer accesses said secondary volume via said host I/F, said host I/F being included in said second network storage device.

11. A storage system according to claim 10, wherein a storage area network (SAN) is connected between said computer and said host I/F of said second network storage device.

12. A storage system according to claim 7, wherein said first I/F in said first network storage device is a disk I/F which is connected for communication with the virtualization apparatus, wherein said second I/F in said second network storage device is a fist host I/F which is connected for communication with said virtualization apparatus, and wherein said third I/F is a second host I/F included in said second network storage device which is connectable for communication with the computer so as to permit said computer to access the second network storage device separately from said virtualization apparatus for configuring the second network storage device.

13. A storage system according to claim 12, wherein said computer is permitted to access said secondary volume which forms the mirroring pair with said primary volume, and not permitted to access said other volumes other than said secondary volume.

14. A storage system according to claim 13, wherein said computer accesses said secondary volume via said second host I/F of said second network storage device.

15. A storage system according to claim 14,
wherein a storage area network (SAN) is connected between said computer and said second host I/F of said second network storage device.

16. A storage system according to claim 14,
wherein a wide storage area network (WSAN) is connected between said virtualization apparatus and said first host I/F of said second network storage device.

17. A storage system according to claim 9,
wherein access control of said secondary volume is configured from outside of said virtualization apparatus via said host I/F.

18. A storage system according to claim 17,
wherein said access control of said secondary volume is configured by:
 creating the mirroring pair between said primary volume and said secondary volume at a certain point in time by taking a complete initial copy of said primary volume and storing said complete initial copy in said secondary volume,
 receiving in said second storage device a suspend request,
 placing the mirroring pair into a suspend status to permit setting of the access control according to user selection,
 if the user chooses a read only mode, setting said secondary volume to the read only mode for input/output (I/O) requests from said computer and re-synchronizing the mirroring pair, and
 if the user chooses a read/write mode, setting said secondary volume to the read/write mode for I/O requests from said computer and re-synchronizing the mirroring pair.

19. A storage system according to claim 18,
wherein when said secondary volume is set to the read only mode access to said secondary volume is performed by:
 suspending synchronization of the mirroring pair including said primary volume and said secondary volume,
 permitting access to data on said secondary volume in response to an I/O request via the host I/F, and
 upon completion of said access, re-synchronizing the mirroring pair.

20. A storage system according to claim 18,
wherein when said secondary volume is set to the read/write mode access to said secondary volume is performed by:
 suspending synchronization of the mirroring pair including said primary volume and said secondary volume,
 permitting access to data on said secondary volume in response to an I/O request via the host I/F, and
 upon completion of said access, re-synchronizing the mirroring pair.

\* \* \* \* \*